US012559981B2

(12) United States Patent
Simon et al.

(10) Patent No.: US 12,559,981 B2
(45) Date of Patent: Feb. 24, 2026

(54) METHODS OF OPERATING A LOCK

(71) Applicant: Endura Products, LLC, Colfax, NC (US)

(72) Inventors: Stephen Simon, Winston-Salem, NC (US); Tomasz Jaskiewicz, Oak Ridge, NC (US)

(73) Assignee: Endura Products, LLC, Colfax, NC (US)

( * ) Notice: Subject to any disclaimer, the term of this patent is extended or adjusted under 35 U.S.C. 154(b) by 155 days.

(21) Appl. No.: 18/210,283

(22) Filed: Jun. 15, 2023

(65) Prior Publication Data

US 2023/0323704 A1 Oct. 12, 2023

Related U.S. Application Data

(63) Continuation of application No. 16/932,305, filed on Jul. 17, 2020, now Pat. No. 11,686,126.

(Continued)

(51) Int. Cl.
*E05B 47/06* (2006.01)
*E05B 47/00* (2006.01)
(Continued)

(52) U.S. Cl.
CPC .......... *E05B 47/0676* (2013.01); *E05B 59/00* (2013.01); *E05B 63/0065* (2013.01);
(Continued)

(58) Field of Classification Search
CPC .. E05B 47/0676; E05B 47/00; E05B 47/0657; E05B 59/00; E05B 63/0065;
(Continued)

(56) References Cited

U.S. PATENT DOCUMENTS 257,401 A 5/1882 Somers
284,381 A 9/1883 Clark
(Continued)

FOREIGN PATENT DOCUMENTS

AU 672893 B2 * 10/1996
AU 2021236491 A1 * 10/2021 ......... E05B 47/0004
(Continued)

OTHER PUBLICATIONS

Kevo Smart Locks, Kwikset, https://www.kwikset.com/kevo, known at least as early as Jan. 20, 2021, 5 pgs.

(Continued)

*Primary Examiner* — Steven A Tullia
(74) *Attorney, Agent, or Firm* — IceMiller LLP

(57) ABSTRACT

A method of controlling a lock mechanism of an active door includes transiting an access controller of the lock mechanism to an authorized access mode and transitioning the access controller from the authorized access mode to an entry mode. Transitioning the access controller to the authorized access mode is in response to an authorized user being sensed approaching the active door from an exterior side of the active door or in response to input on a remote device. In the authorized access mode, an exterior handle of the active door is decoupled from a main latch of the lock mechanism. Transitioning the access controller to the entry mode is in response to sensed contact with the exterior handle. In the entry mode, the exterior handle is capable of rotating to transition the access controller to an unlocked mode in which the exterior handle is operably coupled to the main latch.

19 Claims, 3 Drawing Sheets

Related U.S. Application Data

(60) Provisional application No. 62/875,704, filed on Jul. 18, 2019.

(51) Int. Cl.
*E05B 59/00* (2006.01)
*E05B 63/00* (2006.01)
*E05C 7/04* (2006.01)
*E05C 9/00* (2006.01)
*G07C 9/00* (2020.01)
*G07C 9/27* (2020.01)
*G07C 9/28* (2020.01)

(52) U.S. Cl.
CPC ............ *E05C 7/04* (2013.01); *G07C 9/00182* (2013.01); *G07C 9/00714* (2013.01); *G07C 9/00857* (2013.01); *G07C 9/27* (2020.01); *G07C 9/28* (2020.01); *E05B 2047/0094* (2013.01); *E05B 2063/0082* (2013.01); *E05C 9/008* (2013.01)

(58) Field of Classification Search
CPC ..... E05B 2047/0094; E05B 2047/0056; E05B 2063/0082; E05B 2065/0805; E05B 2001/0076; E05B 13/002; E05B 13/005; E05B 55/06; E05C 7/04; E05C 9/008; E05C 9/00; G07C 9/00182; G07C 9/00714; G07C 9/00857; G07C 9/27; G07C 9/28; G07C 9/00309; G07C 2209/63
USPC ............................................................ 70/226
See application file for complete search history.

(56) References Cited

U.S. PATENT DOCUMENTS 1,208,565 A 12/1916 Johnson
1,574,023 A 2/1926 Crompton et al.
1,985,176 A 12/1934 Lamb
2,253,495 A 8/1941 Cordrey
3,040,391 A 6/1962 Saunders
3,046,776 A 7/1962 Marotto
3,126,727 A 3/1964 Dillard et al.
3,435,644 A 4/1969 Hines
3,594,031 A 7/1971 Ford
3,672,714 A 6/1972 Schultz
3,848,361 A 11/1974 Foster et al.
3,910,613 A 10/1975 Nolin
3,999,789 A 12/1976 Maurits
4,140,357 A 2/1979 Wolz et al.
4,353,582 A 10/1982 Figemeier
4,445,299 A 5/1984 Lehikoinen et al.
4,453,345 A 6/1984 Maus
4,500,120 A 2/1985 Ridgewell
4,850,208 A 7/1989 Weinerman et al.
4,876,783 A 10/1989 Campion et al.
4,899,562 A 2/1990 Gartner et al.
4,926,664 A 5/1990 Gartner et al.
5,134,870 A 8/1992 Uyeda et al.
5,189,837 A 3/1993 Tenaga
5,193,861 A 3/1993 Juga et al.
5,212,907 A 5/1993 Van Sandt
5,290,077 A * 3/1994 Fleming .................. E05C 9/047 292/DIG. 60
5,373,716 A * 12/1994 MacNeil ............... E05C 9/1808 70/489
5,394,718 A 3/1995 Hotzl
5,404,737 A 4/1995 Hotzl
5,437,174 A 8/1995 Aydin
5,474,348 A 12/1995 Palmer et al.
5,490,699 A 2/1996 Uyeda
5,496,082 A 3/1996 Zuckerman
5,520,423 A 5/1996 Finkelstein
5,524,941 A 6/1996 Fleming
5,544,924 A 8/1996 Paster
5,564,296 A 10/1996 Theriault et al.
5,658,026 A * 8/1997 Nigro, Jr. .............. E05B 13/002 70/210
5,685,584 A 11/1997 Baren et al.
5,690,501 A 11/1997 Mader
5,715,715 A 2/1998 Nunez
5,727,960 A 3/1998 Zehrung
5,752,727 A * 5/1998 Zues ....................... E05C 9/042 292/34
5,933,086 A 8/1999 Tischendorf et al.
6,101,856 A * 8/2000 Pelletier ................ E05B 13/101 70/472
6,108,989 A 8/2000 Kordes
6,152,498 A 11/2000 Lindqvist
6,209,931 B1 4/2001 Von Stoutenborough et al.
6,217,087 B1 4/2001 Fuller
6,230,528 B1 5/2001 Don
6,250,119 B1 6/2001 Flon
6,266,981 B1 7/2001 von Resch et al.
6,282,929 B1 9/2001 Eller et al.
6,354,121 B1 3/2002 Frolov
6,381,999 B1 5/2002 Doong
6,443,506 B1 9/2002 Su
6,474,118 B2 11/2002 Martinez
6,478,345 B1 11/2002 Viney
6,497,072 B2 12/2002 Fries
6,497,126 B2 * 12/2002 Wang .................... E05B 13/101 70/472
6,532,779 B2 3/2003 Shen
6,557,909 B2 5/2003 Morris
6,637,784 B1 10/2003 Hauber
6,688,656 B1 2/2004 Becken
6,732,557 B1 5/2004 Zehrung
6,793,253 B2 9/2004 Bruwer et al.
6,812,407 B1 11/2004 Opperman
6,826,867 B1 12/2004 McDonald
6,860,129 B2 * 3/2005 Eller ..................... E05B 55/005 70/217
6,895,791 B2 5/2005 Alexander et al.
6,929,293 B2 8/2005 Tonges
6,971,686 B2 12/2005 Becken
7,025,394 B1 4/2006 Hunt
7,051,561 B2 5/2006 Moon et al.
7,222,508 B2 5/2007 Dickhans et al.
7,293,389 B2 11/2007 Jacobs
7,293,807 B2 * 11/2007 Hemping ................ E05B 1/003 292/336.3
7,303,215 B2 12/2007 Moon et al.
7,353,637 B2 4/2008 Harger et al.
7,377,076 B2 5/2008 Shedd
7,421,868 B2 9/2008 Matyko et al.
7,497,486 B1 3/2009 Davis et al.
7,520,152 B2 4/2009 Sabo et al.
7,526,933 B2 5/2009 Meekma
7,634,928 B2 12/2009 Hunt
7,677,067 B2 3/2010 Riznik
7,696,644 B2 4/2010 Metz et al.
7,701,331 B2 4/2010 Tran
7,707,862 B2 5/2010 Walls et al.
7,735,882 B2 6/2010 Abdollahzadeh et al.
7,752,875 B2 7/2010 Constantinou et al.
7,836,737 B2 11/2010 Lin
7,849,718 B2 12/2010 Ambrass
7,856,857 B2 12/2010 Tsai
7,870,770 B2 * 1/2011 Blanch .................. E05B 13/004 70/279.1
7,871,112 B2 * 1/2011 Kondratuk ............ E05B 63/042 292/137
7,878,034 B2 2/2011 Alber
7,918,117 B2 4/2011 Frolov et al.
7,926,315 B2 4/2011 Poletti
7,946,080 B2 5/2011 Ellerton et al.
8,035,478 B2 10/2011 Lee
8,035,479 B2 10/2011 Tran
8,061,166 B2 11/2011 Tsai
8,146,392 B2 4/2012 Topfer

(56) References Cited

U.S. PATENT DOCUMENTS 8,151,609 B2 4/2012 Stobbe et al.
8,161,779 B2 4/2012 Bergmann
8,161,780 B1 4/2012 Huml
8,199,011 B2 6/2012 Lu
8,231,051 B2 7/2012 Popowski
8,348,308 B2 1/2013 Hagemeyer et al.
8,353,189 B2 1/2013 Bogdanov et al.
8,354,914 B2 1/2013 Buckingham et al.
8,358,197 B2 1/2013 Tran
8,375,645 B2 2/2013 Iwauchi et al.
8,381,444 B1 2/2013 McDonald
8,382,166 B2 2/2013 Hagemeyer et al.
8,398,126 B2 3/2013 Nakanishi et al.
8,419,087 B2 4/2013 Shen
8,448,382 B2 5/2013 Rodgers et al.
8,482,377 B2 7/2013 Finkenzeller
8,505,169 B2 8/2013 Wood et al.
8,517,747 B2 8/2013 Bryla et al.
8,534,099 B2 9/2013 Wheeler et al.
8,534,100 B2 9/2013 Tsai
8,540,288 B2 9/2013 Tsai
8,550,506 B2 10/2013 Nakanishi et al.
8,571,471 B2 10/2013 Kuenzi et al.
8,628,126 B2 1/2014 Hagemeyer et al.
8,772,970 B2 7/2014 Lambron
8,774,714 B2 7/2014 Metivier
8,839,562 B2 9/2014 Madrid
8,887,542 B2 11/2014 Bogdanov et al.
8,899,635 B2 12/2014 Nakanishi et al.
8,905,443 B2 12/2014 Alber
8,937,526 B2 1/2015 Chandler, Jr.
8,973,416 B2 3/2015 Terei et al.
8,997,534 B2 * 4/2015 Rai .......................... E05C 1/10
292/169.14
8,997,535 B2 4/2015 Jeffries
9,003,841 B2 4/2015 Koh
9,024,759 B2 5/2015 Uyeda et al.
9,057,210 B2 6/2015 Dumas et al.
9,074,391 B2 7/2015 Van Parys
9,074,392 B2 7/2015 Berger
9,097,037 B2 8/2015 McKibben et al.
9,098,953 B2 8/2015 Kincaid et al.
9,115,518 B2 8/2015 Herglotz et al.
9,129,457 B2 9/2015 Sumcad et al.
9,169,666 B2 10/2015 Hodgin
9,169,668 B2 10/2015 George
9,212,506 B2 12/2015 Murphy et al.
9,218,696 B2 * 12/2015 Dumas ..................... G07C 9/27
9,222,286 B2 12/2015 Uyeda
9,235,942 B2 1/2016 Chen et al.
9,284,750 B2 3/2016 Maeng et al.
9,287,705 B2 3/2016 Meyer et al.
9,290,966 B2 3/2016 Hanchett, Jr.
9,309,696 B2 4/2016 Friese
9,316,021 B2 4/2016 Burciaga
9,317,984 B2 4/2016 Cregg et al.
9,322,194 B2 4/2016 Cheng et al.
9,322,195 B2 4/2016 Ainley et al.
9,322,201 B1 4/2016 Cheng et al.
9,326,094 B2 4/2016 Johnson et al.
9,328,532 B2 5/2016 Nguyen et al.
9,334,676 B2 5/2016 Lambrou et al.
9,336,637 B2 5/2016 Neil et al.
9,342,936 B2 5/2016 Scalisi
9,361,741 B2 6/2016 Robertson et al.
9,376,849 B2 6/2016 Lim
9,378,596 B2 6/2016 Shen et al.
9,378,597 B2 6/2016 Shen et al.
9,378,598 B2 6/2016 Dumas et al.
9,382,739 B1 7/2016 Johnson et al.
9,390,572 B2 7/2016 Almomani
9,396,599 B1 7/2016 Malhotra
9,406,180 B2 8/2016 Eberwine et al.
9,406,181 B2 8/2016 Almomani et al.
9,416,567 B2 * 8/2016 Ji .......................... E05B 47/026
9,428,937 B2 8/2016 Tagtow
9,428,940 B1 8/2016 Patrick
9,435,142 B2 9/2016 Carpenter et al.
9,435,143 B2 9/2016 Shen
9,437,062 B2 9/2016 Ahearn et al.
9,441,401 B2 9/2016 Nardelli et al.
9,447,609 B2 9/2016 Johnson et al.
9,470,017 B1 10/2016 Cheng et al.
9,470,028 B2 10/2016 Header
9,472,034 B2 10/2016 Ahearn et al.
9,487,971 B2 11/2016 Quach et al.
9,500,007 B2 11/2016 Lambrou et al.
9,501,880 B2 11/2016 Handville et al.
9,501,883 B2 11/2016 Handville et al.
9,502,884 B2 11/2016 Ghisla et al.
9,506,278 B2 11/2016 Mattrisch
9,509,163 B2 11/2016 Corbin et al.
9,512,643 B1 12/2016 Keefe
9,514,585 B2 12/2016 Ahearn et al.
9,520,227 B2 12/2016 Herglotz et al.
9,524,601 B1 12/2016 Dumas
9,528,294 B2 12/2016 Johnson et al.
9,528,296 B1 12/2016 Cheng et al.
9,530,262 B2 12/2016 Johnson
9,530,264 B2 12/2016 Caterino et al.
9,534,420 B1 1/2017 Cheng et al.
9,536,363 B2 1/2017 Ahearn et al.
9,539,755 B2 1/2017 Morin et al.
9,540,843 B2 1/2017 Garrett
9,546,504 B2 1/2017 Overgaard
9,574,372 B2 2/2017 Johnson et al.
9,580,931 B2 2/2017 Myers et al.
9,580,934 B2 2/2017 Baty et al.
9,593,516 B2 3/2017 Nakanishi et al.
9,605,461 B2 3/2017 Zimmer
9,607,459 B2 3/2017 Chang
9,613,476 B2 4/2017 Johnson
9,613,478 B2 4/2017 Dumas et al.
9,617,757 B2 4/2017 Lowder
9,624,695 B1 4/2017 Cheng et al.
9,624,701 B2 4/2017 Taylor et al.
9,626,814 B2 4/2017 Eyring et al.
9,631,400 B2 4/2017 Liu et al.
9,631,920 B2 4/2017 Goldenson
9,637,957 B2 5/2017 Hagemeyer
9,640,004 B2 5/2017 Lowder
9,644,398 B1 5/2017 Cheng et al.
9,644,401 B2 5/2017 Nguyen et al.
9,652,917 B2 5/2017 Johnson et al.
9,670,696 B2 6/2017 Chong
9,673,868 B2 6/2017 Curtis
9,691,207 B2 6/2017 Almomani
9,697,658 B1 * 7/2017 Dumas ..................... G07C 9/28
9,702,168 B2 7/2017 Jadallah et al.
9,704,316 B2 7/2017 Kirkjan
9,721,412 B2 8/2017 Kankkunen et al.
9,725,926 B2 8/2017 Carpenter et al.
9,758,990 B2 9/2017 Beck
9,758,997 B2 9/2017 Hagemeyer et al.
9,787,127 B2 10/2017 Shen
9,790,716 B2 10/2017 Hagemeyer
9,825,443 B2 11/2017 Shah et al.
9,834,956 B2 * 12/2017 Hogan .................. E05B 13/005
9,850,685 B2 12/2017 Dore Vasudevan et al.
9,871,399 B2 1/2018 Mittleman et al.
9,876,387 B2 1/2018 Geiszler
9,940,766 B2 4/2018 Toivonen et al.
9,988,830 B2 6/2018 Raz
9,991,936 B2 6/2018 Toivonen et al.
10,033,972 B2 7/2018 Almomani et al.
10,049,517 B2 8/2018 Geiszler
10,062,230 B2 8/2018 Ahearn et al.
10,077,588 B1 9/2018 Header
10,078,929 B1 9/2018 Chen
10,089,807 B2 * 10/2018 Plüss ....................... H04W 4/80
10,125,519 B1 11/2018 Gengler et al.
10,132,104 B2 11/2018 Dore Vasudevan et al.
10,135,288 B2 11/2018 Geiszler
10,147,254 B1 12/2018 Shen

(56) References Cited

U.S. PATENT DOCUMENTS

| | | | | |
|---|---|---|---|---|
| 10,171,974 | B2 | 1/2019 | Ahearn et al. | |
| 10,192,372 | B2 | 1/2019 | Einberg | |
| 10,202,785 | B2 | 2/2019 | Overgaard | |
| 10,233,672 | B2 | 3/2019 | McKibben et al. | |
| 10,240,365 | B2 | 3/2019 | Almomani et al. | |
| 10,278,547 | B2 | 5/2019 | Morin | |
| 10,347,064 | B2 | 7/2019 | Kim et al. | |
| 10,378,238 | B2 | 8/2019 | Beck et al. | |
| 10,438,431 | B2 | 10/2019 | Stephens et al. | |
| 10,465,422 | B2 | 11/2019 | Ullrich et al. | |
| 10,482,697 | B2 | 11/2019 | Kirkjan | |
| 10,538,947 | B2 | 1/2020 | Boring | |
| 10,876,324 | B2 * | 12/2020 | Jaskiewicz | E05C 9/1875 |
| 10,961,746 | B2 * | 3/2021 | Hood | E05B 63/143 |
| 10,968,660 | B2 * | 4/2021 | Maiga | G07C 9/00309 |
| 10,982,477 | B2 | 4/2021 | Procton et al. | |
| 10,988,965 | B2 | 4/2021 | Procton et al. | |
| 11,060,323 | B2 | 7/2021 | Almomani et al. | |
| 11,066,862 | B1 | 7/2021 | Rowland | |
| 11,111,698 | B2 * | 9/2021 | Mitchell | E05C 9/025 |
| 11,373,471 | B2 | 6/2022 | Anderson et al. | |
| 11,403,902 | B2 * | 8/2022 | Ho | H04L 65/1069 |
| 11,560,736 | B2 | 1/2023 | Kendall et al. | |
| 11,634,944 | B2 | 4/2023 | MacDonald et al. | |
| 11,686,126 | B2 | 6/2023 | Simon et al. | |
| 11,739,564 | B2 | 8/2023 | Kendall et al. | |
| 11,961,347 | B2 * | 4/2024 | Prostko | G07C 9/00896 |
| 2004/0107746 | A1 * | 6/2004 | Chang | E05B 65/1086 70/107 |
| 2005/0092040 | A1 * | 5/2005 | Chuang | E05B 65/1086 70/107 |
| 2005/0179267 | A1 | 8/2005 | Cote et al. | |
| 2006/0000247 | A1 | 1/2006 | Moon et al. | |
| 2006/0112747 | A1 | 6/2006 | Moon et al. | |
| 2006/0164206 | A1 | 7/2006 | Buckingham et al. | |
| 2006/0196236 | A1 * | 9/2006 | Gruenendahl | E05C 9/026 70/107 |
| 2006/0267357 | A1 | 11/2006 | Semtilli | |
| 2008/0127686 | A1 | 6/2008 | Hwang | |
| 2008/0184749 | A1 * | 8/2008 | Alber | E05C 7/06 70/103 |
| 2008/0185918 | A1 | 8/2008 | Metz et al. | |
| 2008/0211239 | A1 | 9/2008 | Keller | |
| 2009/0078011 | A1 * | 3/2009 | Avni | E05C 9/16 70/486 |
| 2009/0255303 | A1 | 10/2009 | Stobbe et al. | |
| 2009/0308116 | A1 | 12/2009 | Lambrou | |
| 2010/0026449 | A1 | 2/2010 | Popowski | |
| 2010/0050530 | A1 | 3/2010 | Blasi | |
| 2010/0308957 | A1 | 12/2010 | Finkenzeller | |
| 2011/0016971 | A1 * | 1/2011 | Yulkowski | G07C 5/0816 73/493 |
| 2011/0018680 | A1 | 1/2011 | Lai et al. | |
| 2011/0056136 | A1 | 3/2011 | Rodgers et al. | |
| 2011/0296761 | A1 | 12/2011 | Wood et al. | |
| 2012/0021628 | A1 | 1/2012 | Bryla et al. | |
| 2012/0108168 | A1 | 5/2012 | Metivier | |
| 2012/0242165 | A1 | 9/2012 | Herglotz et al. | |
| 2012/0267962 | A1 | 10/2012 | Hanchett, Jr. | |
| 2012/0270496 | A1 | 10/2012 | Kuenzi et al. | |
| 2012/0280783 | A1 * | 11/2012 | Gerhardt | H04W 12/08 340/5.6 |
| 2012/0280789 | A1 | 11/2012 | Gerhardt et al. | |
| 2012/0280790 | A1 * | 11/2012 | Gerhardt | G07C 9/00571 340/5.61 |
| 2013/0002397 | A1 | 1/2013 | Chandler, Jr. | |
| 2013/0015674 | A1 | 1/2013 | He | |
| 2013/0019643 | A1 * | 1/2013 | Tagtow | E05B 63/18 70/361 |
| 2013/0176107 | A1 | 7/2013 | Dumas et al. | |
| 2013/0192317 | A1 | 8/2013 | McKibben et al. | |
| 2013/0234453 | A1 | 9/2013 | Murphy et al. | |
| 2014/0001878 | A1 | 1/2014 | Meyer et al. | |
| 2014/0002236 | A1 | 1/2014 | Pineau et al. | |
| 2014/0020295 | A1 | 1/2014 | Bonahoom et al. | |
| 2014/0033773 | A1 | 2/2014 | Myers et al. | |
| 2014/0069154 | A1 | 3/2014 | Dolev | |
| 2014/0077618 | A1 | 3/2014 | Herglotz et al. | |
| 2014/0077929 | A1 * | 3/2014 | Dumas | G07C 9/00571 340/5.61 |
| 2014/0089097 | A1 | 3/2014 | Byun et al. | |
| 2014/0145823 | A1 | 5/2014 | Aase | |
| 2014/0165677 | A1 | 6/2014 | Hickman | |
| 2014/0197692 | A1 | 7/2014 | Chen et al. | |
| 2014/0292481 | A1 | 10/2014 | Dumas et al. | |
| 2014/0340032 | A1 | 11/2014 | Curtis | |
| 2014/0340196 | A1 | 11/2014 | Myers et al. | |
| 2014/0345084 | A1 | 11/2014 | Herglotz et al. | |
| 2015/0107316 | A1 | 4/2015 | Kirkjan | |
| 2015/0114055 | A1 | 4/2015 | Frolov et al. | |
| 2015/0128667 | A1 | 5/2015 | Yoon et al. | |
| 2015/0130287 | A1 | 5/2015 | Steudtner et al. | |
| 2015/0176311 | A1 | 6/2015 | Picard et al. | |
| 2015/0184425 | A1 | 7/2015 | Ellis et al. | |
| 2015/0252595 | A1 | 9/2015 | Hagemeyer et al. | |
| 2015/0308155 | A1 | 10/2015 | Eller et al. | |
| 2015/0315816 | A1 | 11/2015 | Gopalakrishnan et al. | |
| 2016/0017638 | A1 | 1/2016 | Dore Vasudevan et al. | |
| 2016/0060902 | A1 | 3/2016 | Corbin et al. | |
| 2016/0060904 | A1 | 3/2016 | Dore Vasudevan et al. | |
| 2016/0093130 | A1 | 3/2016 | Shen et al. | |
| 2016/0108650 | A1 | 4/2016 | Hagemeyer et al. | |
| 2016/0160530 | A1 | 6/2016 | Shen | |
| 2016/0163139 | A1 | 6/2016 | Kankkunen et al. | |
| 2016/0189459 | A1 | 6/2016 | Johnson et al. | |
| 2016/0194903 | A1 | 7/2016 | White | |
| 2016/0240023 | A1 | 8/2016 | Toivonen et al. | |
| 2016/0244994 | A1 | 8/2016 | Nguyen et al. | |
| 2016/0273243 | A1 | 9/2016 | Geringer et al. | |
| 2016/0308396 | A1 | 10/2016 | Lewis et al. | |
| 2016/0312504 | A1 | 10/2016 | Marsh | |
| 2016/0319569 | A1 | 11/2016 | Johnson et al. | |
| 2016/0328901 | A1 | 11/2016 | Johnson | |
| 2016/0343182 | A1 * | 11/2016 | Dumas | G07C 9/28 |
| 2016/0350988 | A1 | 12/2016 | Malhotra | |
| 2016/0350989 | A1 | 12/2016 | Chang | |
| 2016/0362914 | A1 | 12/2016 | Carpenter et al. | |
| 2016/0376816 | A1 | 12/2016 | Graham | |
| 2017/0002586 | A1 | 1/2017 | Lee | |
| 2017/0018956 | A1 | 1/2017 | Geiszler | |
| 2017/0030112 | A1 | 2/2017 | Kane | |
| 2017/0032597 | A1 | 2/2017 | Johnson | |
| 2017/0032602 | A1 | 2/2017 | Cheng et al. | |
| 2017/0040827 | A1 | 2/2017 | Weber | |
| 2017/0053468 | A1 | 2/2017 | Johnson | |
| 2017/0053469 | A1 | 2/2017 | Cheng et al. | |
| 2017/0058579 | A1 | 3/2017 | Wolf et al. | |
| 2017/0152681 | A1 | 6/2017 | Chiou et al. | |
| 2017/0167164 | A1 | 6/2017 | Baty et al. | |
| 2017/0191287 | A1 | 7/2017 | Mittleman et al. | |
| 2017/0226784 | A1 | 8/2017 | Davis et al. | |
| 2017/0259654 | A1 | 9/2017 | McDonald, II et al. | |
| 2017/0264090 | A1 | 9/2017 | Shah et al. | |
| 2017/0301166 | A1 | 10/2017 | Earles et al. | |
| 2017/0331320 | A1 | 11/2017 | Geiszler | |
| 2017/0358952 | A1 | 12/2017 | Butler et al. | |
| 2017/0373723 | A1 | 12/2017 | Toivonen et al. | |
| 2018/0005470 | A1 | 1/2018 | Stephens et al. | |
| 2018/0051478 | A1 | 2/2018 | Tagtow et al. | |
| 2018/0051480 | A1 | 2/2018 | Tagtow et al. | |
| 2018/0058105 | A1 | 3/2018 | Van Klompenburg | |
| 2018/0068508 | A1 | 3/2018 | Kirkjan | |
| 2018/0073275 | A1 | 3/2018 | Ullrich et al. | |
| 2018/0114389 | A1 | 4/2018 | Geiszler | |
| 2018/0155962 | A1 | 6/2018 | Mitchell et al. | |
| 2018/0187464 | A1 | 7/2018 | Moon et al. | |
| 2018/0190055 | A1 | 7/2018 | Kim et al. | |
| 2018/0202194 | A1 | 7/2018 | Jaskiewicz et al. | |
| 2018/0298642 | A1 | 10/2018 | Tagtow et al. | |
| 2018/0313115 | A1 | 11/2018 | Overgaard | |
| 2018/0313116 | A1 | 11/2018 | Criddle et al. | |
| 2018/0323632 | A1 | 11/2018 | Astarabadi | |
| 2018/0328075 | A1 | 11/2018 | Coster et al. | |

(56) References Cited

U.S. PATENT DOCUMENTS

| | | | |
|---|---|---|---|
| 2018/0340351 | A1 | 11/2018 | Harkonen et al. |
| 2018/0355648 | A1 | 12/2018 | Procton et al. |
| 2018/0355649 | A1 | 12/2018 | Procton et al. |
| 2019/0006875 | A1 | 1/2019 | Bien et al. |
| 2019/0024437 | A1 | 1/2019 | Tagtow et al. |
| 2019/0040653 | A1 | 2/2019 | Baumgarte et al. |
| 2019/0051075 | A1 | 2/2019 | Ahearn et al. |
| 2019/0066413 | A1 | 2/2019 | McLeod et al. |
| 2019/0066419 | A1 | 2/2019 | McLeod et al. |
| 2019/0078361 | A1 | 3/2019 | Worden et al. |
| 2019/0119952 | A1 | 4/2019 | Jaskiewicz |
| 2019/0280531 | A1 | 9/2019 | Ahmed et al. |
| 2019/0360260 | A1 | 11/2019 | Hunter |
| 2020/0048933 | A1 | 2/2020 | Li et al. |
| 2020/0349786 | A1 | 11/2020 | Ho et al. |
| 2020/0354991 | A1* | 11/2020 | Derham .............. E05B 47/0012 |
| 2021/0025214 | A1 | 1/2021 | Dora |
| 2021/0102406 | A1 | 4/2021 | Jaskiewicz et al. |
| 2021/0102407 | A1 | 4/2021 | Jaskiewicz et al. |
| 2021/0207421 | A1 | 7/2021 | Sorice et al. |
| 2022/0319264 | A1 | 10/2022 | Anderson et al. |

FOREIGN PATENT DOCUMENTS

| | | | | | |
|---|---|---|---|---|---|
| CA | 2650128 | A1 | | 10/2007 | |
| CA | 2833984 | A1 | | 11/2012 | |
| CH | 694946 | A5 | * | 9/2005 | |
| CN | 101924398 | A | | 12/2010 | |
| CN | 103477010 | A | | 12/2013 | |
| CN | 204103574 | U | | 1/2015 | |
| CN | 104790834 | A | | 7/2015 | |
| CN | 105896708 | A | | 8/2016 | |
| CN | 105896739 | A | | 8/2016 | |
| CN | 106385112 | A | | 2/2017 | |
| CN | 106593124 | A | | 4/2017 | |
| CN | 206237206 | U | | 6/2017 | |
| CN | 107069986 | A | | 8/2017 | |
| CN | 107257155 | A | | 10/2017 | |
| CN | 107508352 | A | | 12/2017 | |
| CN | 105896708 | B | | 5/2018 | |
| CN | 107979148 | A | | 5/2018 | |
| CN | 108616169 | A | | 10/2018 | |
| CN | 108729758 | A | | 11/2018 | |
| CN | 108767941 | A | | 11/2018 | |
| CN | 109469412 | A | | 3/2019 | |
| CN | 106934881 | B | | 4/2019 | |
| CN | 110130737 | A | | 8/2019 | |
| CN | 110165758 | A | | 8/2019 | |
| CN | 106385112 | B | | 11/2019 | |
| DE | 3612761 | A1 | | 10/1987 | |
| DE | 4114007 | A1 | * | 12/1991 | |
| DE | 10139675 | A1 | | 2/2003 | |
| DE | 102007021979 | B3 | | 8/2008 | |
| DE | 102008008142 | A1 | | 8/2009 | |
| DE | 102010061173 | B3 | | 1/2012 | |
| DE | 202012007916 | U1 | | 10/2012 | |
| DE | 102013109272 | A1 | | 3/2015 | |
| DE | 102009061095 | B3 | | 2/2016 | |
| EP | 0330828 | B1 | | 11/1992 | |
| EP | 662554 | A2 | * | 7/1995 | |
| EP | 0846823 | A1 | | 6/1998 | |
| EP | 0942135 | A1 | | 9/1999 | |
| EP | 1182312 | A2 | | 2/2002 | |
| EP | 1340871 | A2 | | 9/2003 | |
| EP | 1408456 | A2 | | 4/2004 | |
| EP | 1464783 | A2 | | 10/2004 | |
| EP | 1617020 | A2 | | 1/2006 | |
| EP | 2264263 | A2 | | 12/2010 | |
| EP | 2441055 | A1 | | 4/2012 | |
| EP | 2468989 | A2 | | 6/2012 | |
| EP | 2919202 | A1 | | 9/2015 | |
| EP | 3059359 | A1 | | 8/2016 | |
| EP | 2660785 | A3 | | 3/2017 | |
| EP | 3349192 | A1 | | 7/2018 | |
| FR | 2677396 | B1 | | 9/1995 | |
| FR | 3028547 | A1 | | 5/2016 | |
| GB | 452535 | A | | 8/1936 | |
| GB | 2323626 | A | | 9/1998 | |
| GB | 2358668 | A | | 8/2001 | |
| GB | 2400135 | A | | 10/2004 | |
| GB | 2483888 | A | | 3/2012 | |
| JP | 2001003617 | A | * | 1/2001 | |
| JP | 2003184369 | A | | 7/2003 | |
| JP | 2005146844 | A | * | 6/2005 | |
| KR | 20010027072 | A | | 4/2001 | |
| KR | 100341117 | B1 | | 6/2002 | |
| KR | 200402154 | Y1 | | 11/2005 | |
| KR | 20050114754 | A | | 12/2005 | |
| KR | 100656273 | B1 | * | 12/2006 | |
| KR | 100672847 | B1 | | 1/2007 | |
| KR | 101038578 | B1 | | 6/2011 | |
| KR | 20110125008 | A | | 11/2011 | |
| KR | 101139493 | B1 | | 5/2012 | |
| KR | 20120003725 | U | | 5/2012 | |
| KR | 200461208 | Y1 | | 6/2012 | |
| KR | 101511059 | B1 | | 4/2015 | |
| KR | 101517832 | B1 | | 5/2015 | |
| KR | 20160018439 | A | | 2/2016 | |
| KR | 101601153 | B1 | | 3/2016 | |
| KR | 101610319 | B1 | | 4/2016 | |
| KR | 101651279 | B1 | | 8/2016 | |
| KR | 101656046 | B1 | | 9/2016 | |
| KR | 10-2064703 | | | 1/2020 | |
| WO | 0077330 | A1 | | 12/2000 | |
| WO | 2004025057 | A1 | | 3/2004 | |
| WO | 2005106165 | A2 | | 11/2005 | |
| WO | 2007/082959 | A1 | | 7/2007 | |
| WO | 2007100167 | A1 | | 9/2007 | |
| WO | 2009115140 | A1 | | 9/2009 | |
| WO | WO-2010085132 | A1 | * | 7/2010 | ......... E05B 47/0669 |
| WO | 2010144449 | A1 | | 12/2010 | |
| WO | 2011159921 | A1 | | 12/2011 | |
| WO | 201213589 | A3 | | 5/2012 | |
| WO | 2014/111502 | A1 | | 7/2014 | |
| WO | 2014108263 | A1 | | 7/2014 | |
| WO | WO-2015023737 | A1 | * | 2/2015 | ......... G07C 9/00174 |
| WO | 2016/180970 | A1 | | 11/2016 | |
| WO | 2017006164 | A1 | | 1/2017 | |
| WO | 2017068518 | A1 | | 4/2017 | |
| WO | 2018075605 | A1 | | 4/2018 | |
| WO | 2018/115159 | A1 | | 6/2018 | |
| WO | 2018/199370 | A1 | | 11/2018 | |
| WO | 2018204147 | A1 | | 11/2018 | |
| WO | 2019018901 | A1 | | 1/2019 | |
| WO | 2019/183340 | A1 | | 9/2019 | |

OTHER PUBLICATIONS

Unikey Residential Access, Smart Lock Pioneer. http://www.unikey.com/industries/residential/; May 19, 2017. 4 pgs.

Amesbury Hardware Products, Tru-Lock, Multi-Point Swing Door Lock, Amesbury Hardware Products Catalog; Sep. 2011, 12 pgs.

Schlage Sense Smart Deadbolt, http://www.schlage.com/en/home.html,, May 19, 2017, 4 pages.

Lark-Wi Index, Video Smart Lock Smart Keypad Fob App Cloud Solution Product Comparison, http://lark-wi.com/website/Index.html, May 19, 2017, 16 pgs.

Danalock V3—smarten up your home, https://danalock.com/index.html, May 19, 2017, 5 pgs.

August Smart Lock & Smarter Homes Access Products, http://august.com/. May 19, 2017, 3 pgs.

Heid, George, U.S. Appl. No. 29/833,019, filed Mar. 31, 2022.

Canadian Office Action for Canadian Serial No. 3007415, dated Mar. 11, 2019, 4 pgs.

Sierra Pacific Windows, http://www.sierrapacificwindows.com/patio-sliding-doors.cfm, known at least as early as Mar. 4, 2017, 1 pg.

Marvin Windows and Doors, "Built Around You, Remodeling & Replacement Solutions," https://urldefense.proofpoint.com/v2/url?u=http-3A_pdf.archiexpo.com_pdf_- marvin_remodeling-2Dreplacement-2Dsolutions_9530-2D308205.html, known at least as early as2016, 13 pgs.

(56) References Cited

OTHER PUBLICATIONS

Masonite M-PWR Smart Doors, Masonite, https://www.masonite.com/mpwr-smart-doors/, known at least as early as Jun. 20, 2022, 32 pages.
http://www.bing.com/images/search?view=detailV2&ccid=yeqyu1DM&pccid=Z0LOW8Op&id=31CCF5B332D25AC96860677A&E59654417E32B97&pmid=609FBEDBEC2475FA0FD2B6D95890BB30AA5C0E75&&q=sliding+entryway+door&psimid=608029545001520736&ppageurl=http%3a%2f%2fmydomishko.ru%2fmezhkomnatnys-razdyizhnye-

* cited by examiner

METHODS OF OPERATING A LOCK

CROSS-REFERENCE TO RELATED APPLICATIONS

This application is a continuation of U.S. patent application Ser. No. 16/932,305, filed Jul. 17, 2020, which claims priority to, and benefit of, U.S. Provisional Patent Application Ser. No. 62/875,704, filed Jul. 18, 2019. The entire contents of each of the above applications is hereby incorporated by reference.

BACKGROUND

1. Technical Field

The present disclosure relates to locks and, more specifically, to methods for operating or controlling a lock.

2. Discussion of Related Art

Builders have several options when designing entryways for homes or businesses. Typically, entryways either include a single hinged door or a set of double doors. If double doors are present, the two doors are typically arranged with the free, non-hinged edge of each door facing each other. An entryway may have double doors with an astragal positioned between the two doors. The door with the astragal can be referred to as a passive door and is usually maintained in a closed position with shoot bolts extending from the astragal. The door without the astragal can be referred to as the active door, which is more often opened to allow passage through the entryway. If a single door is present, the single door may be referred to as an active door.

Residents and business owners often rely upon cylindrical or mortise type locks, incorporated within the active door, in order to secure the entryway. In some instances, separate deadbolts are used, in addition to generally centrally located latches, to secure a door panel.

In addition to cylindrical or mortise type locks, builders have found that multipoint locks that have more than one latch or bolt, which are substantially spaced from one another, often provide a more secure closure that is able to seal and secure the entryway better than traditional single-point hardware. Because several latches or bolts are extended or retracted simultaneously, non-trivial effort is sometimes required to operate these multipoint locks.

In addition, smart home technology has begun to interconnect operation of several systems within a home or business. For example, deadbolts for door panels can now be locked or retracted by powered systems based upon an input from a key pad, fob, smart phone, or similar device. Many of the existing powered locks, however, include powered actuation of only a single deadbolt. Prior art powered locks also include substantial packaging placed on the interior or exterior face of the door panel.

SUMMARY

This disclosure relates generally to methods of controlling locks and deadbolts using smart home technology.

Briefly described, the method detailed herein includes setting a mode of a lock with an access controller. The access controller is configured to connect and disconnect at least the external handle associated with the lock from the lock in response to inputs from the lock or a device. For example, the access controller may connect the external handle to the lock in response to the device approaching the lock or in response to an input on the device. The access controller may also detect contact with the external handle to allow unlocking of the lock, prevent unlocking of the lock, or to lock the lock.

In an embodiment of the present disclosure, a method of controlling a lock mechanism of an active door includes transiting an access controller of the lock mechanism to an authorized access mode and transitioning the access controller from the authorized access mode to an entry mode. Transitioning the access controller to the authorized access mode is in response to an authorized user being sensed approaching the active door from an exterior side of the active door or in response to input on a remote device. In the authorized access mode, an exterior handle of the active door is decoupled from a main latch of the lock mechanism. Transitioning the access controller to the entry mode is in response to sensed contact with the exterior handle. In the entry mode, the exterior handle is capable of rotating to transition the access controller to an unlocked mode in which the exterior handle is operably coupled to the main latch and capable of retracting the main latch such that the active door is capable of moving to an open position.

In embodiments, transitioning the access controller to the authorized access mode includes setting the access controller to the authorized access mode for a predetermined access time. The method may include transitioning the access controller to a latch disconnect mode if the access controller remains in the authorized access mode after the predetermined access time. In the latch disconnect mode, the exterior handle remains decoupled from the main latch. The predetermined access time may be in a range of 5 seconds to 30 seconds. Transitioning the access controller to the entry mode may include setting the access controller to the entry mode for a predetermined entry time and transitioning the access controller to the latch disconnect mode if the access controller remains in the entry mode after the predetermined entry time. The predetermined entry time may be in a range of 0.5 seconds to 5 seconds.

In some embodiments, the method includes transitioning the access controller from the entry mode to an unlocked mode in response to the exterior handle being rotated in a first direction form a neutral position. The access controller may switch the lock mechanism to an operating configuration when in the unlocked mode such that the exterior handle is operably coupled to the main latch and capable of retracting the main latch. The active door may be capable of moving to an open position when the main latch is in retracted. The method may include transitioning the access controller form the entry mode or the unlocked mode to a latch disconnect mode such that the exterior handle is decoupled from the main latch in response to the exterior handle being rotated in a second direction opposite the first direction from the neutral position. The method may include the access controller transitioning to the latch disconnect mode in response to extension of the main latch or a deadbolt of the lock mechanism to a deadbolt position.

In certain embodiments, the access controller transitions to the latch disconnect mode in response to direct input on the remote device. Transitioning the access controller of the lock mechanism to the authorized access mode is in response to sensing the remote device approaching the active door from the exterior side of the active door or in response to direct input on the remote device. The remote device may be in operable communication with the access controller.

In particular embodiments, transition the access controller of the lock mechanism to the authorized access mode requires both an authorized user being sensed approaching the active door from the exterior side of the active door and direct input on the remote device.

In another embodiment of the present disclosure, a method of operating a lock mechanism of an active door includes detecting an authorized user approaching an exterior side of the active door or receiving direct input on a remote device such that an access controller of the lock mechanism transition to an authorized access mode, transitioning the access controller to the entry mode such that the exterior handle is operably coupled handle to the main latch, and transitioning the access controller to an unlocked mode in response to movement of the exterior handle of the active door in a first direction from a natural position whether access controller is in the entry mode. In the authorized access mode, the exterior handle is decoupled from a main latch of the lock mechanism such that the exterior handle is prevented from operating the main latch of the lock mechanism. In the unlocked mode of the access controller, the exterior handle is operably coupled to the main latch such that movement of the exterior handle in the first direction retracts the main latch to allow the active door to move to an open position.

In embodiments, transitioning the access controller to the entry mode includes entering a panic/release function in which rotation of the exterior handle in the first direction form a natural position retracts the main latch and rotation of the exterior handle in a second direction from the natural position, opposite the first direction, transitions the access controller to a latch disconnect mode in which the exterior handle is decoupled from the main latch.

In some embodiments, the method includes rotating a deadbolt hub to extend a main latch or a deadbolt to a deadbolt position such that the access controller transitions from the unlocked mode to a latch disconnect mode in which the exterior handle is decoupled form the main latch.

In certain embodiments, the method includes transitioning the access controller from the unlocked mode to a latch disconnect mode in which the exterior bundle is decoupled form the main latch in response to direct input on the remote device. The method may include transitioning the access controller to a latch disconnect mode from the authorized access mode after a predetermined access time in the authorized access mode or from the entry mode after a predetermined entry time in the entry mode.

In another embodiment of the present disclosure, a lock mechanism includes an exterior handle, a main latch, and an access controller, the main latch having a latched position in which the door is prevented from moving from a closed position and a retracted position in which the door is allowed to move from the closed position. The access controller having a first mode in which the main latch is decoupled form the exterior handle and a second mode in which the main latch is operably coupled to the exterior handle such that the exterior handle is configured to actuate the main latch between the latched position and the retracted position.

In embodiments, the access controller is configured to translate a pin between the first mode and the second mode. The pin may couple and decouple the drive hub from the main latch. The access controller may transition from the first mode to the second mode in response to input from a remote device and contact with an exterior handle of the door. The input from the remote device may be proximity of the remote device to the access controller or is direct input on the remote device.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are incorporated in and constitute a part of this specification, wherein.

DETAILED DESCRIPTION

Figure 1:
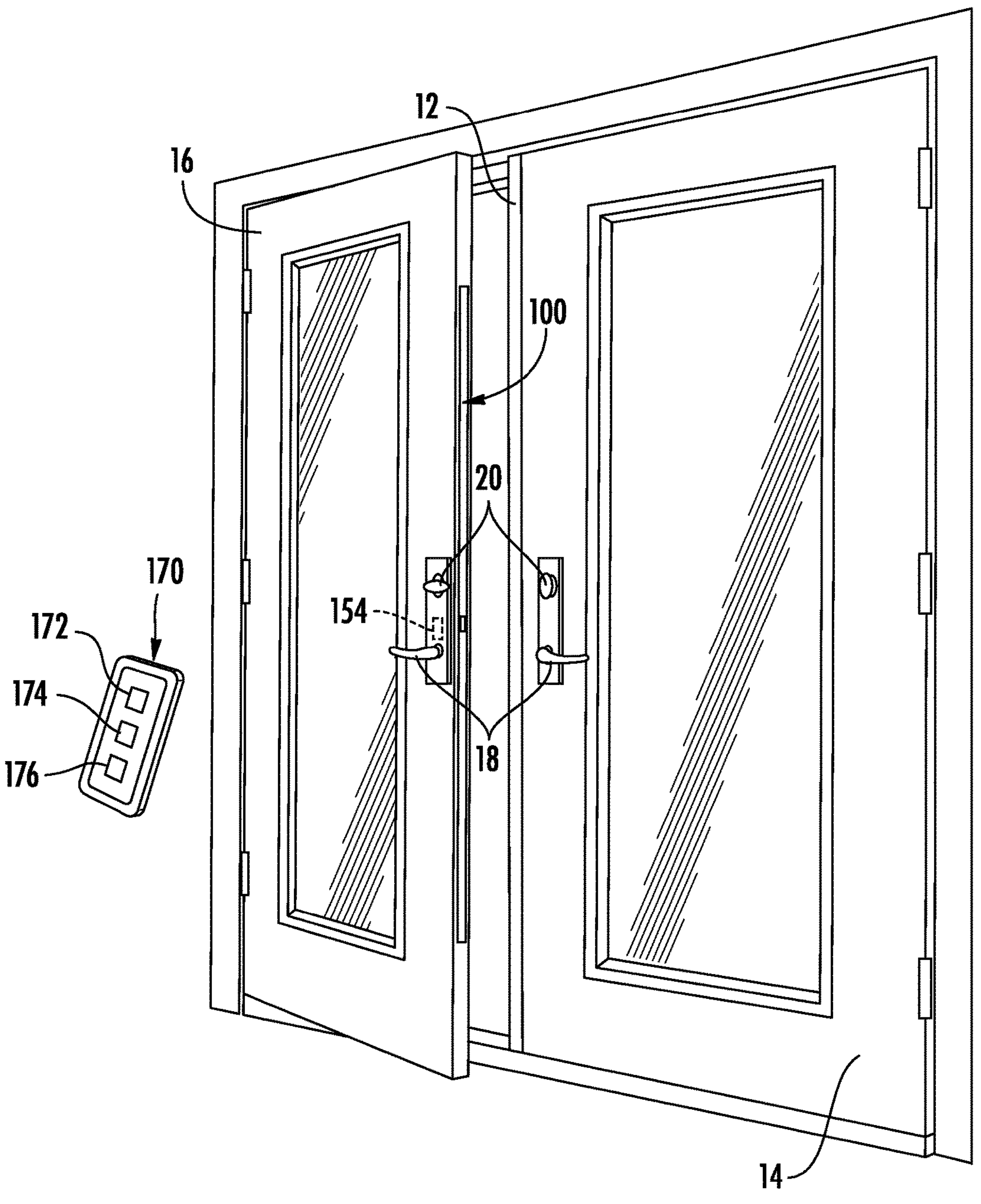
FIG. 1 is a perspective view of an entryway including a lock system provided in accordance with an embodiment of the present disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

As used herein the term "latch" is defined as a member that slides or pivots into a catch, strike plate, hole, keeper, etc. to fasten or secure a door panel in a closed position relative to the frame of an entryway. The term "latch" as used herein may include structures referred to in the art as latches, latch bolts, and bolts. Latches may or may not be spring loaded unless specifically noted. Latches can extend vertically or horizontally in relation to the door panel of an entryway. As understood by one of ordinary skill in the art, the directions of rotation, relative to a clock, of handles, thumb-turn knobs, and key cylinders can depend upon whether a door panel is mounted for inswing or outswing operation and can be depend upon whether a door is hinged for left hand or right hand operation. Therefore, directional terms such as clockwise and counterclockwise are used in conjunction with their corresponding illustrated embodiment, and alternative mounting arrangements for changing swing or handedness would be understood by one of ordinary skill in the art.

In embodiments, the method described in accordance with the present disclosure may control a multipoint lock configured for mounting onto a non-hinged edge of an active or passive door panel to secure the door panel relative to the frame of an entryway. The multipoint lock may include a thumb-turn knob, an exterior handle lever, and an interior handle lever. The thumb-turn knob may control a deadbolt function of one or more latches and/or a separate deadbolt. The handle levers may operate a single latch or multiple latches. The multipoint lock may also include a powered actuator configured to extend and retract the latch and/or the deadbolt. In addition, the multipoint lock may include an access controller that may disconnect the handle lever from the latch or latches. It will be appreciated that the methods described herein may also be used to control a single point lock with or without a deadbolt.

FIG. 1 illustrates an example of an entryway 10 having double doors with an astragal 12 positioned between the two doors. The door with the astragal 12 can be referred to as a passive door 14 and usually maintained in a closed position with shoot bolts extending from the astragal. The door without the astragal 12 can be referred to as the active door 16, which is more often opened to allow passage through the entryway 10. If a single door is present, the single door may be referred to as an active door; e.g., active door 16.

Figure 2:
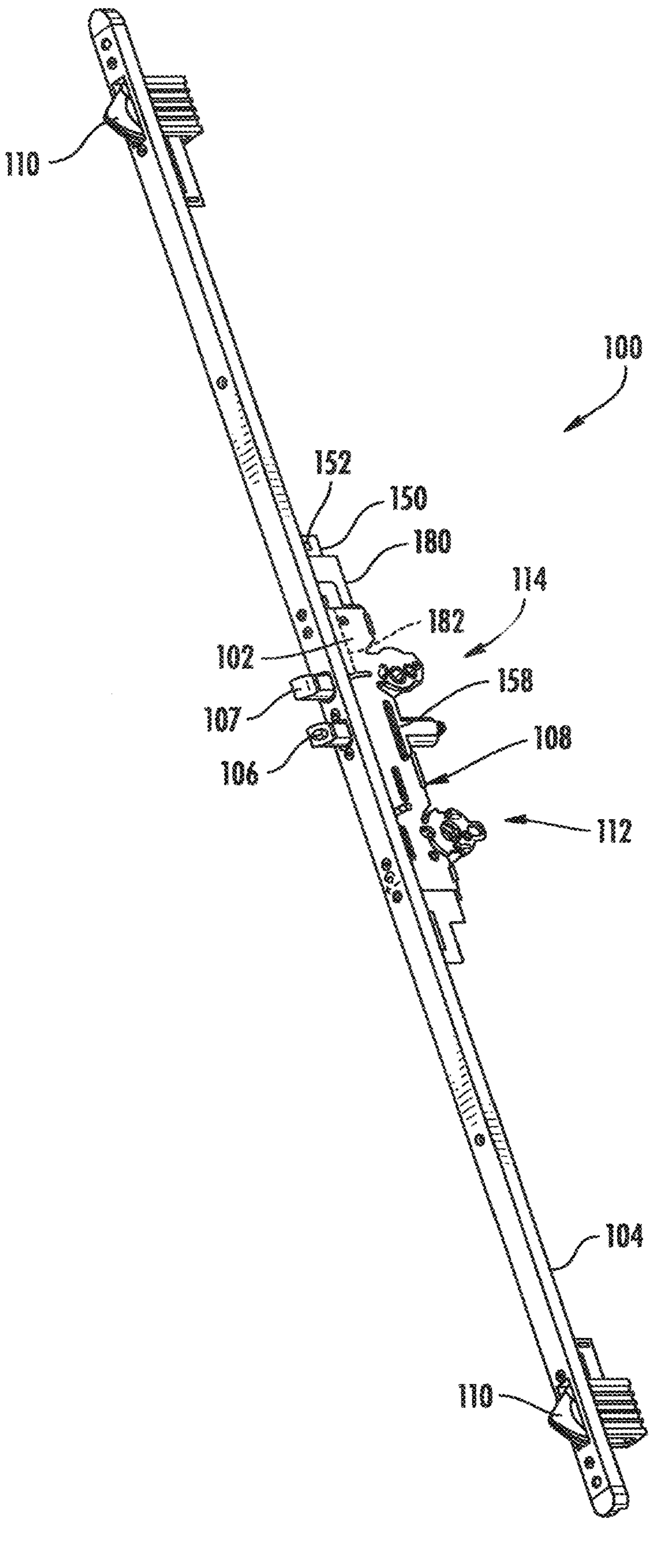
FIG. 2 is a perspective view of a multipoint lock of the lock system of FIG. 1.

FIG. 2 shows a multipoint lock 100 incorporating auxiliary latches 110 and a main or center latch 106. The multipoint lock 100 may also include a deadbolt 107 separate from the center latch 106. The multipoint lock 100 is suitable for mounting into the non-hinged edge of an active door 16 (FIG. 1). The auxiliary latches 110 are configured to extend from the non-hinged vertical edge of the active door 16 into a jamb or a passive door 14 of the entryway 10 (FIG. 1). The auxiliary latches 110 can be of a type that extends and retracts from the non-hinged vertical edge of the active door 16 as shown or alternatively, the auxiliary latches 110 can be shoot bolt types that extend vertically to mate with the header and the threshold.

The multipoint lock 100 has an operating configuration in which the center latch 106 is in a latched position and extends a first latch distance from the edge of the active door 16 and may be retracted to a released position into the edge of the active door 16 by operating an exterior handle lever 18, an interior handle lever (not shown), or by the center latch 106 engaging a strike plate as the active door 16 is closed. In the operating configuration, the auxiliary latches 110 may be in a retracted position within an edge, e.g., a vertical edge, of the active door. In some embodiments, in the operating configuration, auxiliary latches 110 may be movable between a first extended position and the retracted position in response to operating the handle lever 18 or the interior handle lever in a manner similar to the center latch 106. In the first extended position, the auxiliary latches 110 extend a first auxiliary distance from the edge of the active door 16. When the multipoint lock 100 includes the deadbolt 107, the deadbolt 107 is in a retracted position in the operating configuration of the multipoint lock 100.

The multipoint lock 100 also has a locked configuration in which the center latch 106 is in the latched position and is prevented from being retracted to the released position, e.g., prevented from being back driven. In the locked configuration, the auxiliary latches 110 may be in the first extended position and prevented from retracting to the retracted position or may be in the retracted position. In the locked configuration, the handle lever 18 or the interior handle lever may be prevented from rotating or from operating the multipoint lock 100. When the multipoint lock 100 includes the deadbolt 107, the deadbolt 107 is in a retracted position in the locked configuration of the multipoint lock 100.

The multipoint lock 100 also has a fully locked configuration in which the center latch 106 is prevented from retracting to the released position. In the fully locked configuration, the center latch 106 may be in a deadbolt position and extend a second latch distance from the edge of the active door 16 that is greater than the first latch distance. In the fully locked configuration, the handle lever 18 may freely rotate or may be prevented from rotating. In the fully locked configuration, the auxiliary latches 110 may be in the first extended position or may be in a second extended position in which the auxiliary latches 110 extend a second auxiliary distance from the edge of the active door 16 that is greater than the first auxiliary distance. When the multipoint lock 100 includes the deadbolt 107, the deadbolt 107 is in an extended position in the fully locked configuration of the multipoint lock 100 and extends from an edge of the active door 16. In some embodiments, in the fully locked configuration, the deadbolt 107 is in the extended position, the center latch 106 is in the latched position and prevented from retracting, e.g., prevented from being back driven, and the auxiliary latches 110 are in the first extended positions and prevented from retracting, e.g., prevented from being back driven.

The multipoint lock 100 can be operated with the handle lever 18 or the interior handle lever and a thumb-turn knob 20 (FIG. 1) in operable engagement with a mortise box 108 (FIG. 2). As is generally known in the art, the handle lever 18 or the interior handle lever can be biased to a neutral, typically horizontal position. The user can then rotate one of the handle lever 18 or the interior handle lever in a first direction, e.g., downward, or in a second direction opposite the first direction, e.g., upward. Though handle lever 18 is illustrated, knobs may be used in place of one or both of the handle lever 18 or the interior handle lever. In some embodiments, the thumb-turn knob 20 may be replaced by a key cylinder lock set. In addition, the handle lever 18 and the interior handle lever may be independent of one another or can be dependent on one another.

In some embodiments, the multipoint lock 100 includes a powered mechanism 180 that is configured to transition the multipoint lock 100 between the operating configuration, the locked configuration, and the fully locked configuration. The powered mechanism 180 is configured to translate a lock rod 182 to control the configuration of the multipoint lock 100. The powered mechanism 180 may include a linear actuator, a rotary motor, or another mechanism configured to translate the lock rod 182. In some embodiments, the powered mechanism 180 may be back driven by the lock rod 182. For example, the handle lever 18, the interior handle lever, or the thumb-turn knob 20 may translate the lock rod 182 to back drive the powered mechanism 180.

For additional detail on exemplary multipoint locks, reference may be made to U.S. Patent Publication Nos. 2018/0155962 and 2018/0202194, the entire contents of each of these disclosures is hereby incorporated by reference.

The multipoint lock 100 also includes an access controller 150 that is configured to control a mode of the multipoint lock 100. The access controller 150 transitions the multipoint lock 100 between a latch disconnect mode, an authorized access mode, an entry/exit mode, and an unlocked mode. As used herein, the mode of the multipoint lock 100 may be described as a mode of the access controller 150 to improve clarity between modes of the multipoint lock 100 and configurations of the multipoint lock 100 with the modes being control modes and configurations being physical configurations of the multipoint lock 100. The access controller 150 may also be in communication with the powered mechanism 180 to control a configuration of the multipoint lock 100.

The access controller 150 includes a proximity sensor 152 that detects the position or proximity of a user relative to the active door 16. The proximity sensor 152 may detect a device 170 that is on the body of the user to determine the position or proximity of a user. The device 170 may be a fob, a smart phone, a remote, a computer, or another suitable device for interfacing with the access controller 150. More than one device 170 may be associated with the multipoint lock 100. The proximity sensor 152 may differentiate the position or proximity of the device 170 between the device 170 being on an exterior of the active door 16 and the device 170 being on an interior of the active door 16. The proximity of the device 170 to the access controller may be considered input from the device 170.

The access controller 150 may include a pin 158 that is movable, e.g., translatable, within the multipoint lock 100 between a coupled or linked position in which the handle lever 18 is connected to the multipoint lock 100 and a decoupled or delinked position in which the handle lever 18 is disconnected from the multipoint lock 100. The pin 158 may be part of a solenoid, an electromagnetic actuator, or a linear actuator. In some embodiments, the powered mechanism 180 moves the pin 158. In particular embodiments, the pin 158 may also connect and disconnect the interior handle lever from the multipoint lock 100. In certain embodiments, the access controller 150 includes the pin 158 to connect and disconnect the handle lever 18 from the multipoint lock 100 and another pin to connect and disconnect the interior handle lever from the multipoint lock 100 independent of the handle lever 18.

The device 170 may include a first button 172, a second button 174, or a third button 176. The buttons 172, 174, 176 may be physical buttons or may be virtual buttons of an application of the device 170. The functions of one or more of the buttons 172, 174, 176 may be combined into a single button. For example, the first button 172 may transition the access controller 150 to the latch disconnect mode when the access controller 150 is in the unlocked mode and may transition the multipoint lock 100 to the fully locked configuration when the access controller 150 is in the latch disconnect mode.

Figure 3:
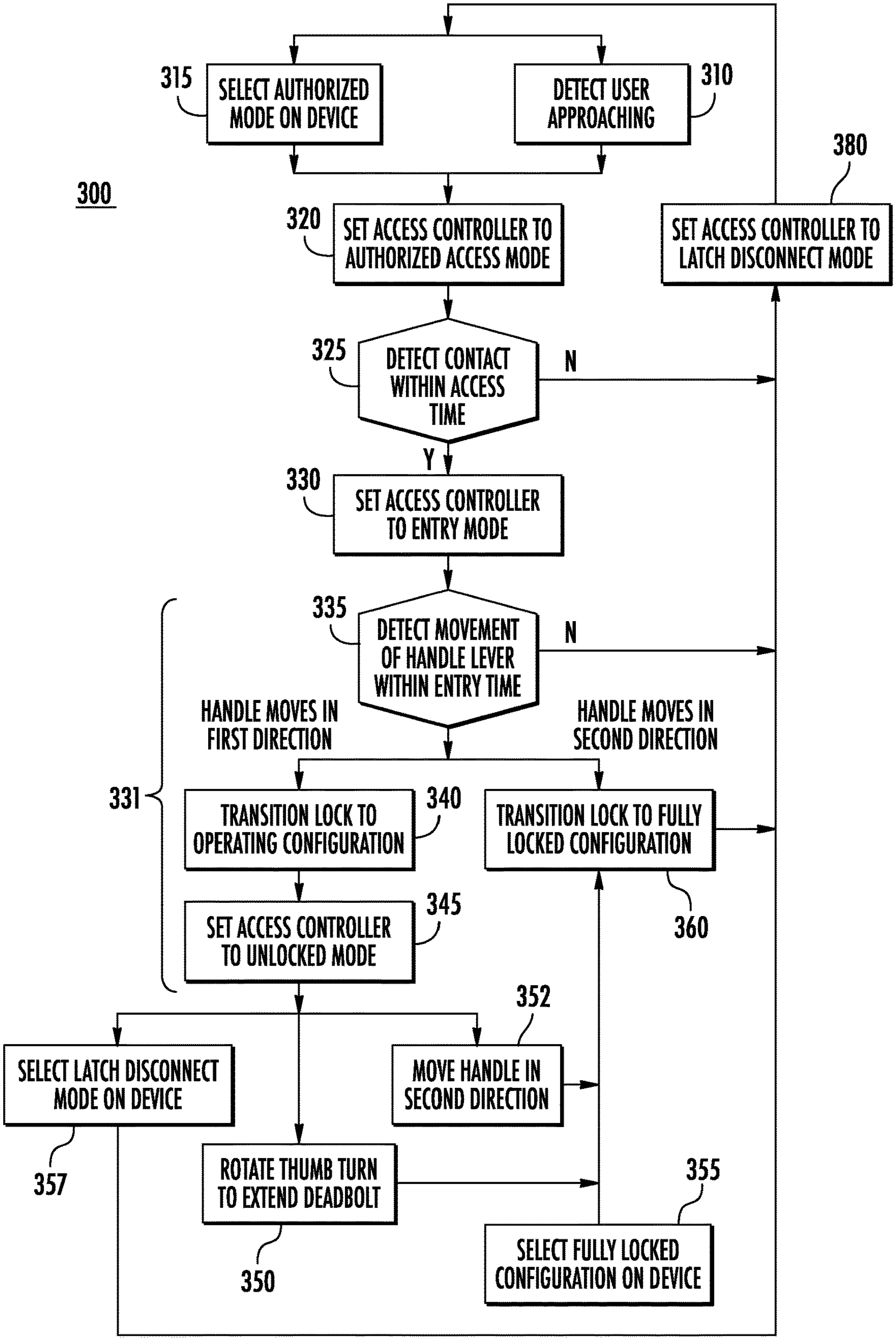
FIG. 3 is a flowchart illustrating a method of operating a lock in accordance with an embodiment of the present disclosure.

With reference to FIG. 3, a method of controlling a lock 300 is detailed with reference to the multipoint lock 100 of FIG. 2. Initially, the multipoint lock 100 may be in any configuration, e.g., the operating, locked, or fully locked configuration, and the access controller 150 is in the latch disconnect mode. In the latch disconnect mode, the pin 158 of the access controller 150 is in a delinked position such that the center latch 106 is disconnected from operation of the handle lever 18. The auxiliary latches 110 and/or deadbolt 107 may also be disconnected from operation of the handle lever 18 in the latch disconnect mode. In the latch disconnect mode, the handle lever 18 may be prevented from rotating from the neutral position or may freely rotate from the neutral position. In certain embodiments, the pin 158 prevents rotation of the handle lever 18 from the neutral position in the latch disconnect mode.

As a user approaches the active door 16 from an exterior side, the proximity sensor 152 detects the device 170 (Step 310). The proximity sensor 152 may sense or detect the device 170 through a Bluetooth® connection, a WiFi connection, a RFID connection, or another suitable connection. When the proximity sensor 152 detects the device 170, the access controller 150 recognizes the user as an authorized user and transitions to the authorized access mode (Step 320). In the authorized access mode, the access controller 150 activates one or more handle sensors 154 (FIG. 1) to detect contact with or a touch of the handle lever 108 from the user (Step 325). Upon contact with the handle lever 18, the access controller 150 transitions the multipoint lock 100 to an entry/exit mode in which the handle lever 18 is reconnected with the multipoint lock 100 (Step 330). Specifically, the access controller 150 may move, e.g., translate the pin 158 to a linked position to reconnect the handle lever 18 with the multipoint lock 100. The access controller 150 may limit the authorized access mode to a predetermined access time after the access controller 150 enters the authorized access mode and before the user contacts the handle lever 18 (Step 325). The predetermined access time may be in a range of 5 seconds to 30 seconds. Additionally or alternatively, the access controller 150 may limit the entry/exit mode to a predetermined entry time after the user contacts the handle lever 18 and before the user moves the handle lever 18 from the neutral position (Step 335). The predetermined entry time may be in a range of 0.5 seconds to 5 seconds. If the user does not contact the handle lever 18 within the predetermined access time or does not move the handle lever 18 within the predetermined entry time, the access controller 150 may revert to the latch disconnect mode (Step 380).

In the entry/exit mode, the access controller 150 may have a panic/release function 331 in which the direction of movement of the handle lever 18 can unlock the multipoint lock 100 or fully lock the multipoint lock 100. For example, in the entry/exit mode movement of the handle lever 18 in the first direction, e.g., downward, transitions the multipoint lock 100 to the operating configuration (Step 340) and transitions the access controller 150 to the unlocked mode (Step 345). Specifically, movement of the handle lever 18 in the first direction is capable of transitioning the multipoint lock 100 from the fully locked configuration to the operating configuration and to move the center latch 106 to the released position and the deadbolt 107 and auxiliary latches 110 to the retracted positions thereof. In the unlocked mode, the access controller 150 allows movement of the handle lever 18 to operate the multipoint lock 100.

When the multipoint lock 100 is in the operating configuration and the access controller 150 is in the unlocked mode, the multipoint lock 100 may be transitioned between the operating configuration and the locked configuration without transitioning the access controller 150 from the unlocked mode. In the unlocked mode, the multipoint lock 100 may be operated by the handle lever 18 or the interior handle lever.

To transition the access controller 150 from the unlocked mode, the thumb turn 20 can be rotated (Step 350) to transition the multipoint lock 100 to the fully locked configuration (Step 360) and to transition the access controller 150 to the latch disconnect mode (Step 380). The thumb turn 20 may be rotated from an interior or an exterior of the active door 16. When the thumb turn 20 is rotated from the exterior of the active door 16, a key cylinder may be used to rotate the thumb turn 20.

In addition, the access controller 150 can be transitioned from the unlocked mode to the latch disconnect mode by selecting a first button 172 on the device 170 (Step 357). When the access controller 150 is transitioned to the latch disconnect mode by the device 170, the multipoint lock 100 may transition to the locked configuration or remain in the operating configuration in response to the access controller 150 transitioning to the latch disconnect mode.

When the access controller 150 is in the latch disconnect mode, the device 170 may include a second button 174 that is configured to transition the access controller 150 into the authorized access mode (Step 315). When in the authorized access mode, contact with the handle lever 18 transitions the access controller 150 to the entry/exit mode as detailed above (Step 330). The device 170 may transition the access controller 150 to the authorized access mode when the device 170 is within the interior of the active door 16. In particular embodiments, the device 170 may transition the access controller 150 to the authorized access mode when the device 170 is entirely remote to the active door 16. For example, the device 170 may be connected to the internet and the access controller 150 may be connected to the internet or an intranet with internet access such that the device 170 may transition the access controller 150 to the authorized access mode. Specifically, the second button 174 can be depressed to transition the access controller 150 to the authorized access mode (Step 315). In the authorized access mode, the access controller 150 can be transitioned to the entry/exit mode as detailed above.

In the entry/exit mode, the panic/release function 331 allows movement of the handle lever 18 in the second direction, e.g., upward, (Step 352) to transition the multipoint lock 100 to the fully locked configuration (Step 360) and transitions the access controller 150 to the latch disconnect mode (Step 380). By allowing movement of the handle lever 18 in the second direction to transition the multipoint lock 100 to the fully locked mode and the access controller 150 to the latch disconnect mode, the multipoint lock 100 can be locked from the exterior of the active door 16 without use of a key. This may be useful when exiting a structure through the active door 16 by allowing a user to confirm that the multipoint lock 100 is locked by moving the handle lever 18 in the second direction from the exterior of the active door 16. In the entry/exit mode, movement of the interior handle lever in the second direction may also be used to transition the multipoint lock 100 to the fully locked configuration and to transition the access controller 150 to the latch disconnect mode.

Utilizing the method 300 above, the access controller 150 may be used for a user to enter through the active door 16 and to secure the active door 16 after entry. For example, when the active door 16 is secured with the multipoint lock 100 in the locked or fully locked configurations or the access controller 150 in the latch disconnect mode, a user may be detected when approaching the door (Step 310), contact the handle lever 18 from the exterior of the active door (Step 325), and move the handle lever 18 in the first direction, e.g., downward, to unlock the multipoint lock 100 and transition the multipoint lock 100 to the unlocked configurations (Step 340). Once inside, the user can choose to leave the multipoint lock 100 in the operating configuration, lock the multipoint lock 100, fully lock the multipoint lock 100, or disconnect the handle lever 18 from operating the multipoint lock 100. The access controller 150 allows the user to transition the multipoint lock 100 to the fully locked configuration or to disconnect the handle lever 18 from operating the multipoint lock 100 by moving the interior handle lever in the second direction, rotating the thumb turn 20, or by using the device 170.

In addition, utilizing the method 300 above, the access controller 150 may be used to allow a guest to enter through the active door 16. Specifically, the user can use the second button 174 to select the authorized access mode on the access controller 150 (Step 315) when the user knows a guest is arriving. The device 170 may allow the user to set a time for the access controller 150 to remain in the authorized access mode or the time may be predetermined. For example, the user may set the time in a range of 1 minute to 2 hours or more. When the guest arrives and contacts the handle lever 18 within the set time (Step 325), the access controller 150 transitions to the entry/exit mode until the guest moves the handle lever 18 (Step 335). The guest may then enter through the active door 16 by moving the handle lever 18 in the first direction. When the guest is inside, the guest can choose to leave the multipoint lock 100 in the operating configuration, lock the multipoint lock 100, or fully lock the multipoint lock 100.

Further, utilizing the method 300 above, the access controller 150 may be used to allow the user, or a guest, to exit and lock the active door 16. Specifically, the user, or guest, may use the interior handle lever to open the active door 16 and exit. When outside, the user, or guest, can close the active door 16 and move the handle lever 18 in the second direction (Step 352) to transition the multipoint lock 360 to the fully locked configuration (Step 360) and to disconnect the handle lever 18 from operation of the multipoint lock (Step 380). This allows the user, or the guest, to secure the active door 16 without requiring a key or the device 170. In addition, the user may utilize the device 170 to disconnect the handle lever 18 from the multipoint lock 100 (Step 357) or to set the multipoint lock in the fully locked configuration (Step 355). The method allows a user, or a guest, to be confident that a door, e.g., active door 16, is secured when exiting by moving the handle lever 18 upward after exiting and closing the door.

In addition, utilizing the method 300 above, the access controller 150 and the device 170 may allow a user to lock the active door 16 when remote to the active door 16. For example, the user can use the third button 176 of the device 170 (Step 355) to transition the lock to the fully locked configuration (Step 360) and to set the access controller 150 to the latch disconnect mode (Step 380). This can be done through a Bluetooth® connection or a local WiFi connection if the user is local to the active door 16 or through an internet connection if the user is remote to the active door 16. In some embodiments, the access controller 150 may provide a status of the access controller 150 or the multipoint lock 100 through the device 170.

While the access controller 150 and the method 300 are detailed above with respect to the multipoint lock 100 and the active door 16, this is not meant to be limiting and the access controller and/or method 300 may be used in conjunction with any suitable locking mechanism for an active door or a passive door.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A door and lock mechanism combination for a door, the combination comprising:

a drive hub configured to rotate in response to rotation of an exterior handle of the door; and a main latch having a latched position in which the main latch extends a first latch distance from the lock edge of the door and a released position in which the main latch is substantially retracted within the door such that the door is allowed to move from a closed position, the lock mechanism having an operating configuration in which the main latch is operably coupled to the drive hub such that the main latch is translated in response to rotation of the drive hub, the lock mechanism having a fully locked configuration in which the main latch is decoupled from the drive hub, wherein the drive hub translates the main latch to a deadbolt position in response to rotation of the exterior handle in a first direction from a neutral state, the main latch extending a second latch distance, greater than the first latch distance, from the lock edge of the door in the deadbolt position.

2. The door and lock mechanism combination according to claim 1, wherein the drive hub translates the main latch to the released position in response to rotation of the exterior handle in a second direction, opposite the first direction, from the neutral state when the lock mechanism is in the operating configuration.

3. The door and lock mechanism combination according to claim 2, wherein the lock mechanism transitions to the fully locked configuration in response to rotation of the exterior handle in the first direction from the neutral state.

4. The door and lock mechanism combination according to claim 1, wherein the lock mechanism comprises a pair of auxiliary latches, the pair of auxiliary latches having a retracted arrangement in which each auxiliary latch of the pair of auxiliary latches are retracted within the lock edge when the lock mechanism is in the operating configuration, the pair of auxiliary latches having an extended arrangement in which each auxiliary latch of the pair of auxiliary latches extends an auxiliary distance from the lock edge of the door when the lock mechanism is in the fully locked configuration.

5. The door and lock mechanism combination according to claim 4, wherein the drive hub translates the main latch to the released position in response to rotation of the exterior handle in a second direction from a neutral state when the lock mechanism is in the operating configuration.

6. The door and lock mechanism combination according to claim 5, further comprising a lock hub that transitions the lock mechanism between the operating configuration and the fully locked configuration in response to rotation of the lock hub.

7. The door and lock mechanism combination according to claim 1, wherein the drive hub translates the main latch to the released position in response to rotation of an interior handle of the door in a second direction from the neutral state when the lock mechanism is in the fully locked configuration.

8. The door and lock mechanism combination according to claim 7, wherein the drive hub is configured to prevent rotation of the exterior handle from the neutral state when the lock mechanism is in the fully locked configuration.

9. The door and lock mechanism combination according to claim 1, further comprising a deadbolt having an unlocked position in which the deadbolt is retracted within the lock edge such that the door is allowed to move from the closed position and a locked position in which the deadbolt is extended from the lock edge such that the door is prevented from moving from the closed position, the deadbolt in the unlocked position when the lock mechanism is in the operating configuration and the deadbolt in the locked position when the lock mechanism is in the fully locked configuration.

10. A door with a lock mechanism, the door having an exterior surface, an interior surface opposite the exterior surface, a hinged edge extending between the exterior surface and the interior surface, and a lock edge extending between the exterior surface and the interior surface opposite the hinged edge, the door and lock mechanism comprising:

a main latch translatable between a released position in which the main latch is substantially retracted within the lock edge of the door such that the door is moveable from a closed position thereof and a latched position in which the main latch extends a first latch distance from the lock edge;

an access controller disposed within the door between the interior surface and the exterior surface, the access controller having an unlocked mode in which the access controller is configured to operably couple the main latch to an exterior handle of the door within the door, between the interior surface and the exterior surface, such that the main latch translates in response to rotation of the exterior handle, and a latch disconnect mode in which the access controller is configured to decouple the main latch from the exterior handle within the door, between the interior surface and the exterior surface; and the access controller having a proximity sensor configured to detect an authorized user relative to the lock mechanism, the access controller transitioning from the latch disconnect mode to an authorized access mode in which the access controller activates a touch sensor.

11. The door with the lock mechanism according to claim 10, wherein the main latch translates from the latched position to the released position in response to rotation of the exterior handle in a first direction from a neutral state when the access controller is in the unlocked mode.

12. The door with the lock mechanism according to claim 11, wherein the main latch decouples from the exterior handle in response to rotation of the exterior handle in a second direction from the neutral state, opposite the first direction, when the access controller is in the unlocked mode, the access controller transitioning from the unlocked mode to the latch disconnect mode in response to rotation of the exterior handle in the second direction.

13. The door with the lock mechanism according to claim 10, further comprising a drive hub selectively coupled to the main latch such that the drive hub translates the main latch to the released position, the drive hub configured to rotate in response to rotation of the exterior handle, the access controller decouples the main latch from the drive hub in the latch disconnect mode.

14. The door with the lock mechanism according to claim 10, wherein the proximity sensor is further configured to detect the proximity of a remote device relative to the lock mechanism, the access controller transitioning from the latch disconnect mode to an authorized access mode in which the access controller is configured to activate a touch sensor of the exterior handle in response to detecting the proximity of the remote device to the lock mechanism.

15. The door with the lock mechanism according to claim 10, wherein the access controller comprises a pin moveable between a linked position in which the pin is configured to operably couple the exterior handle of the door to the main latch within the door and a delinked position in which the pin is configured to decouple the exterior handle from the main latch within the door such that the pin prevents rotation of the exterior handle away from a neutral state.

16. The door with the lock mechanism according to claim 10, further comprising a pair of auxiliary latches, the pair of auxiliary latches having a retracted arrangement in which each auxiliary latch of the pair of auxiliary latches are retracted within the door such that the door is moveable from the closed position when the access controller is in the unlocked mode, the pair of auxiliary latches having an extended arrangement in which each auxiliary latch of the pair of auxiliary latches are extended an auxiliary distance from the door when the access controller is in the latch disconnect mode.

17. The door with the lock mechanism according to claim 16, further comprising an actuator in electrical communication with the access controller, the actuator configured to extend and retract the auxiliary latches between the retracted arrangement and the extended arrangement in responses to the access controller transitioning between the unlocked mode and the latch disconnect mode.

18. A method of controlling a door with a lock mechanism, the door having a lock edge, the method comprising:

translating a main latch of the lock mechanism from a first latched position in which the main latch extends from the lock edge of the door to a released position in which the main latch is retracted substantially within the lock edge such that the door is moveable from a closed position in response to rotation of an exterior handle of the door in a first direction from a neutral state; and transitioning the lock mechanism to a fully locked configuration in which the main latch is decoupled from the exterior handle within the door in response to rotation of the exterior handle in a second direction from the neutral state, opposite the first direction, wherein rotation of the exterior handle in the second direction further translates the main latch to a deadbolt position, the main latch extending to a second latch position, further from the lock edge of the door than the first latched position.

19. The method according to claim 18, wherein transitioning to the fully locked configuration comprises decoupling the main latch from a drive hub of the lock mechanism.

* * * * *